(12) United States Patent
Mondesir

(10) Patent No.: US 10,391,710 B2
(45) Date of Patent: Aug. 27, 2019

(54) DEPOSITION OF NON-UNIFORM NON-OVERLAPPING CURVILINEAR SEGMENTS OF ANISOTROPIC FILAMENT TO FORM NON-UNIFORM LAYERS

(71) Applicant: Arevo, Inc., Santa Clara, CA (US)

(72) Inventor: Wiener Mondesir, Oakland, CA (US)

(73) Assignee: Arevo, Inc., Milpitas, CA (US)

(*) Notice: Subject to any disclaimer, the term of this patent is extended or adjusted under 35 U.S.C. 154(b) by 202 days.

(21) Appl. No.: 15/634,460

(22) Filed: Jun. 27, 2017

(65) Prior Publication Data

US 2018/0370143 A1 Dec. 27, 2018

(51) Int. Cl.
| | |
|---|---|
| *B29C 64/386* | (2017.01) |
| *B29C 64/393* | (2017.01) |
| *B33Y 50/02* | (2015.01) |
| *B33Y 80/00* | (2015.01) |
| *B29C 70/38* | (2006.01) |
| *B33Y 10/00* | (2015.01) |
| *B33Y 50/00* | (2015.01) |
| *B29C 64/118* | (2017.01) |

(52) U.S. Cl.
CPC .......... *B29C 64/386* (2017.08); *B29C 64/118* (2017.08); *B29C 64/393* (2017.08); *B29C 70/382* (2013.01); *B33Y 10/00* (2014.12); *B33Y 50/00* (2014.12); *B33Y 50/02* (2014.12); *B33Y 80/00* (2014.12)

(58) Field of Classification Search
CPC .................................................. B29C 64/386
USPC ............................................................. 428/61
See application file for complete search history.

(56) References Cited

U.S. PATENT DOCUMENTS 4,910,064 A * 3/1990 Sabee .................. D04H 3/04
156/62.4

* cited by examiner

*Primary Examiner* — Brent T O'Hern
(74) *Attorney, Agent, or Firm* — McGeary Cukor LLC; Jason Paul DeMont; Kenneth Ottesen

(57) ABSTRACT

A process of additive manufacturing in which a stack of non-planar layers of material are deposited for manufacturing an object. The non-planar layers can conform to the surface of the object or not. The non-planar layers can create structurally-advantageous interior structures in the object. The contours of the non-planar layers can be different or can be the same.

20 Claims, 20 Drawing Sheets

Deposition Layers DL[1], DL[25], DL[50], DL[75], DL[100], DL[125], DL[150], DL[175], DL[200], DL[220], and DL[240], For First Illustrative Embodiment
(Orthographic Front Elevation View at Cross-Section AA-AA)
(Layer Hidden Lines Not Shown)

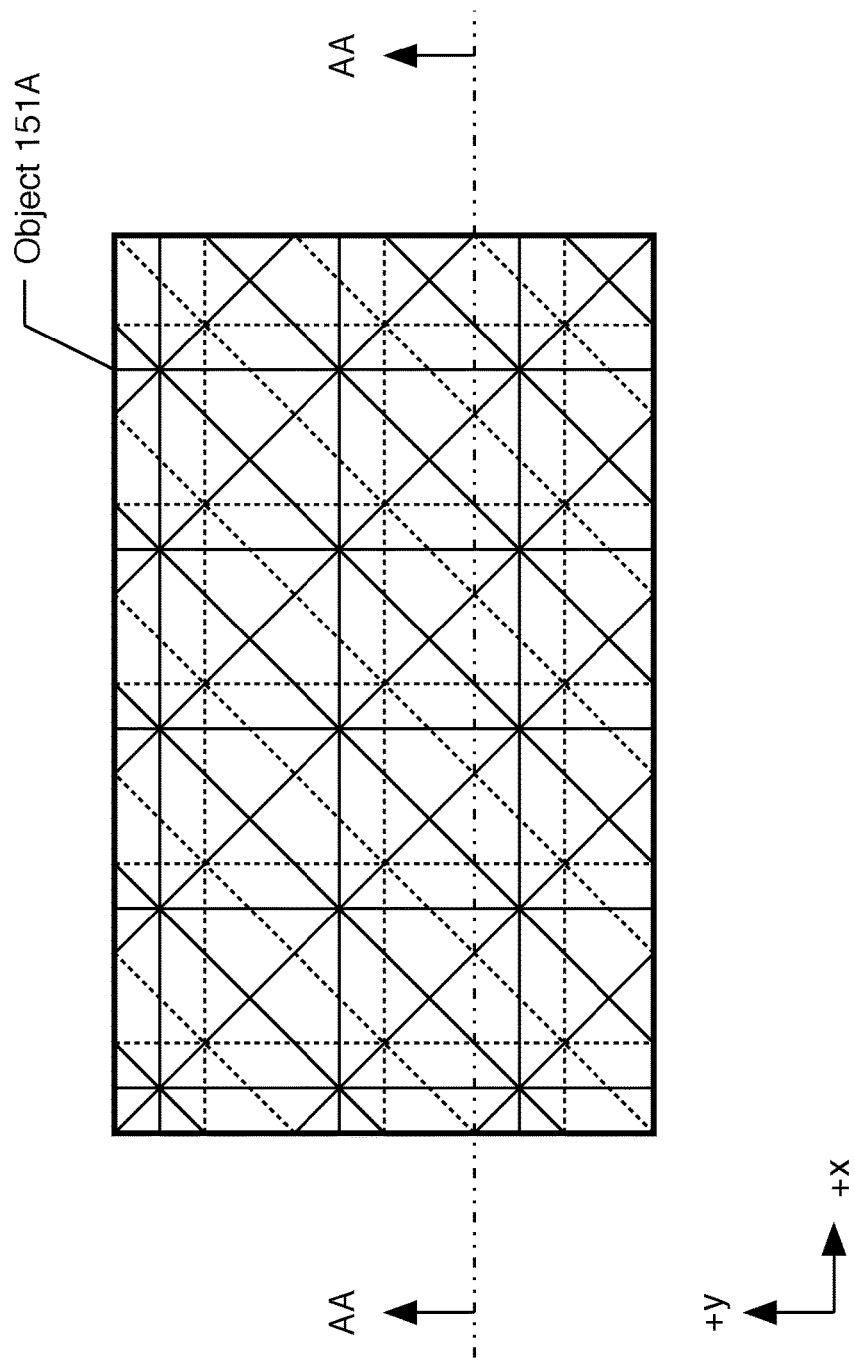

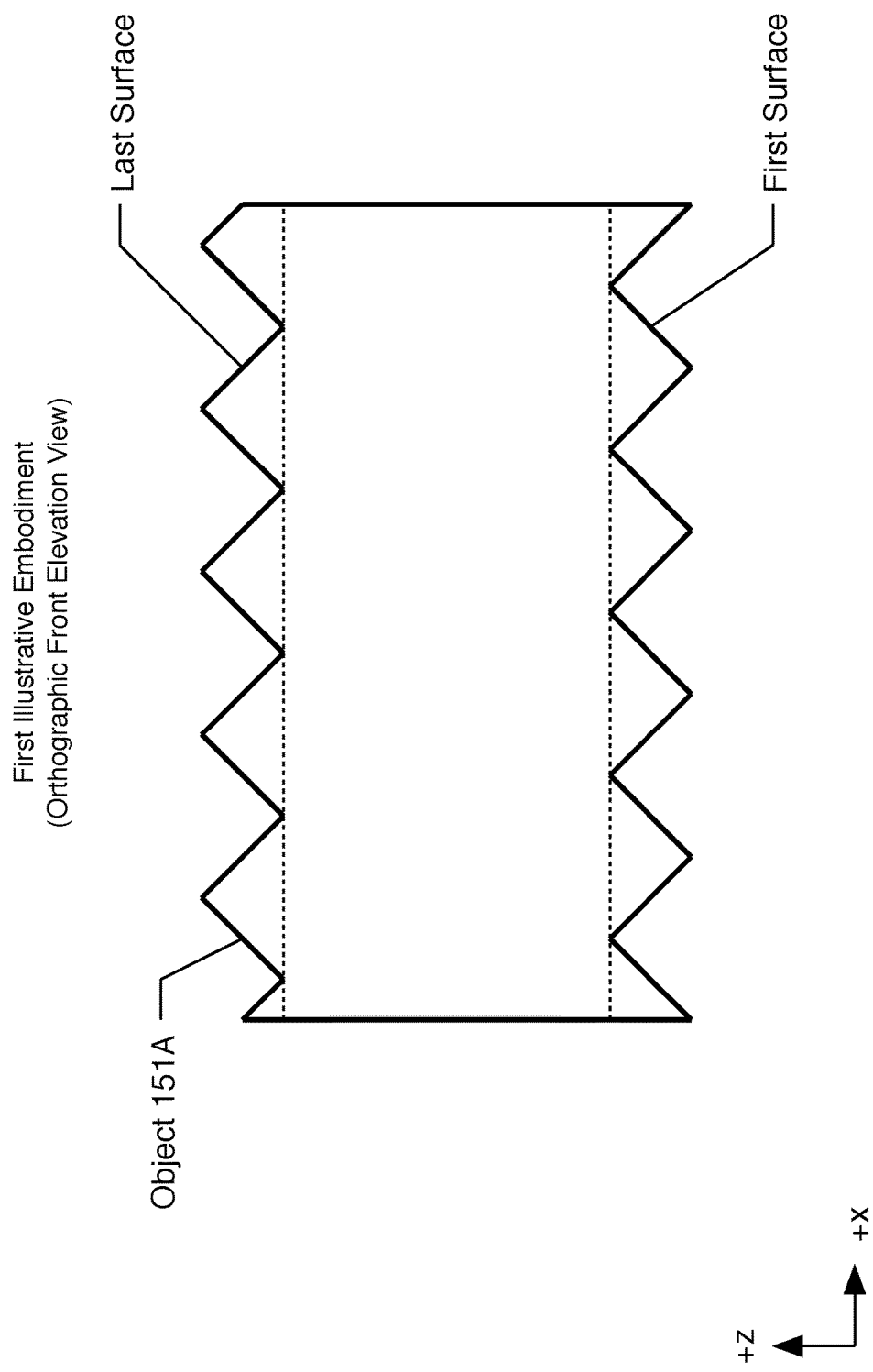

Deposition Layer DL[100]
For First Illustrative Embodiment
(Orthographic Front Elevation View at Cross-Section AA-AA)
(DL[100] Hidden Lines Not Shown)

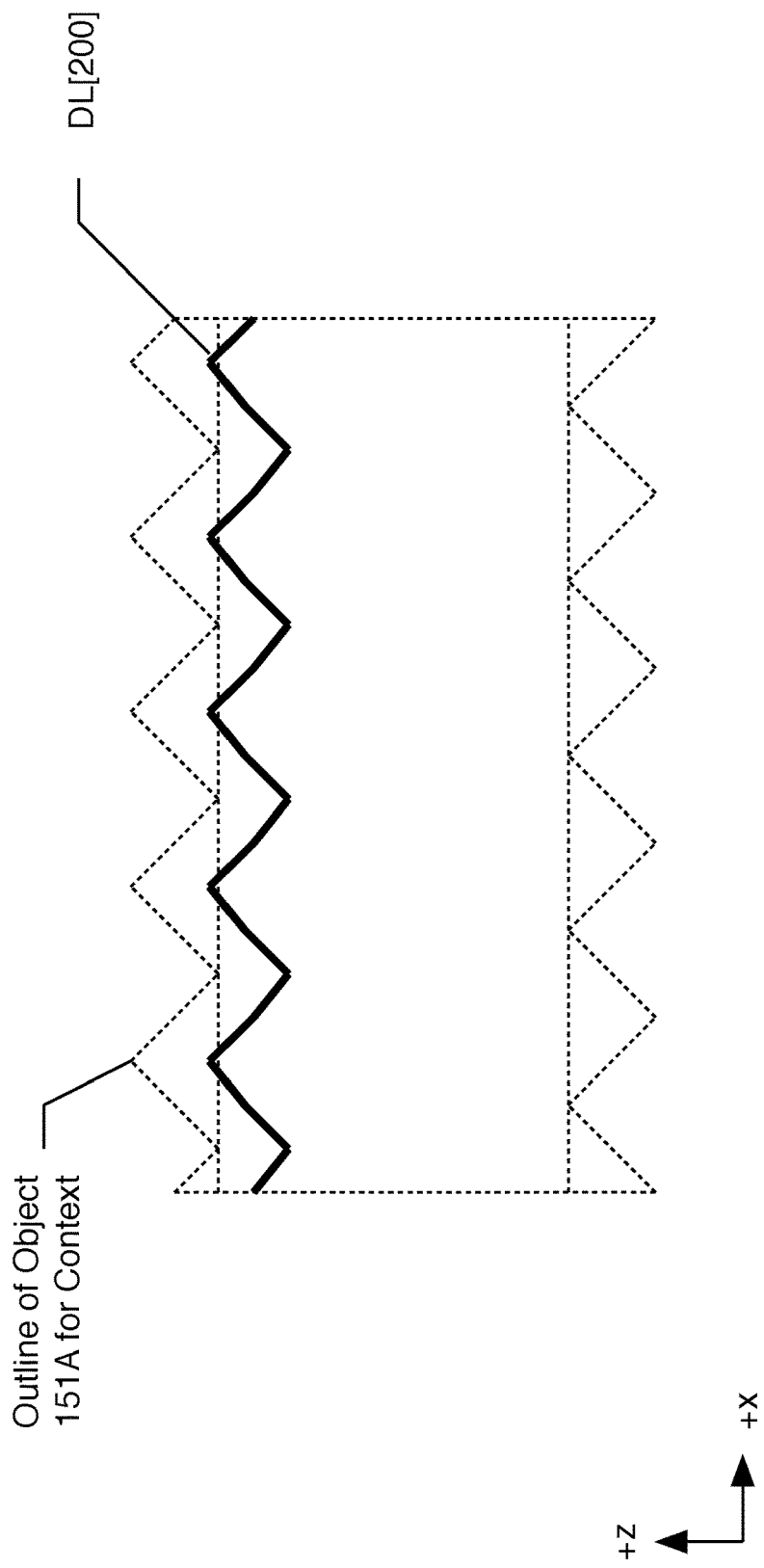

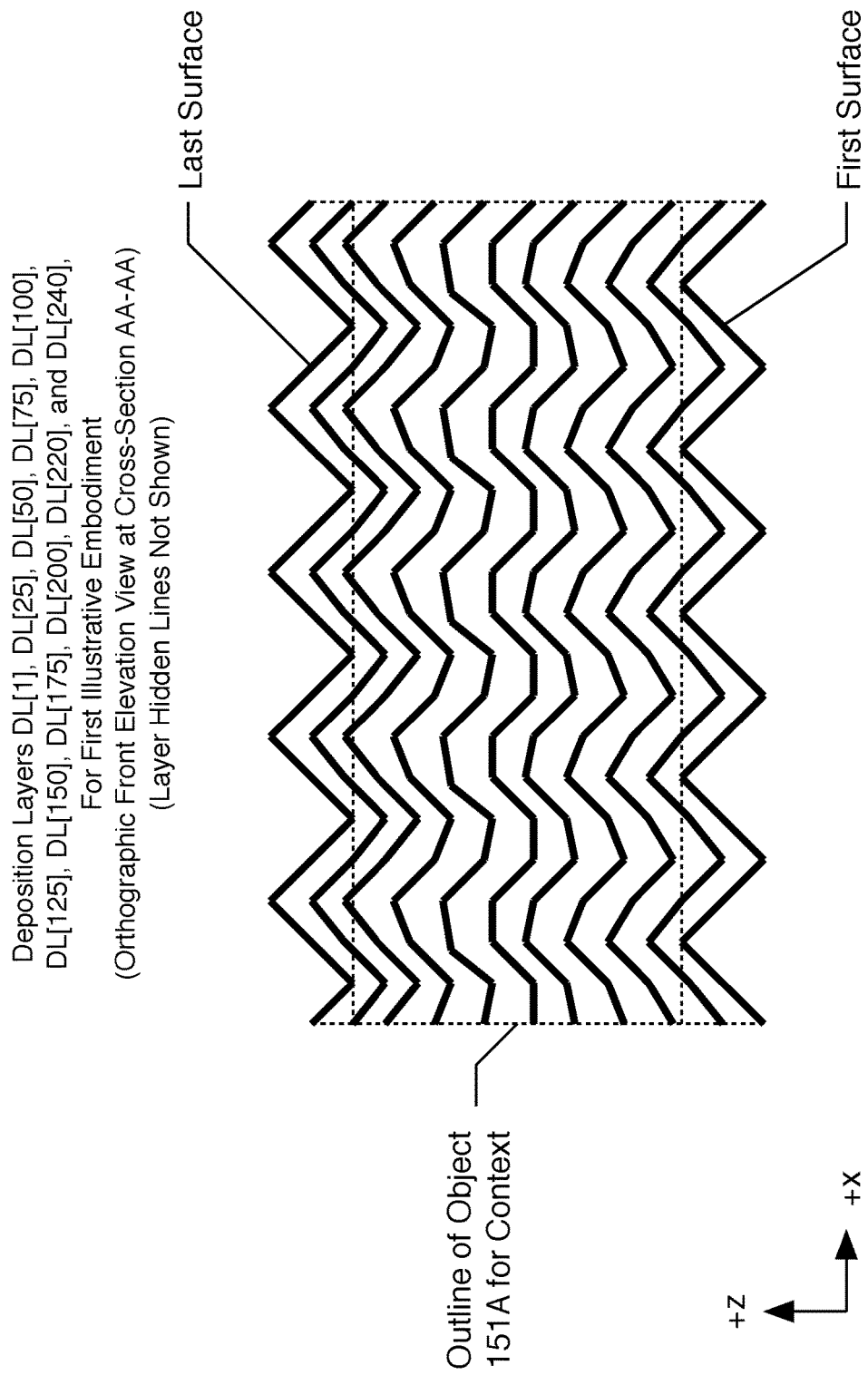

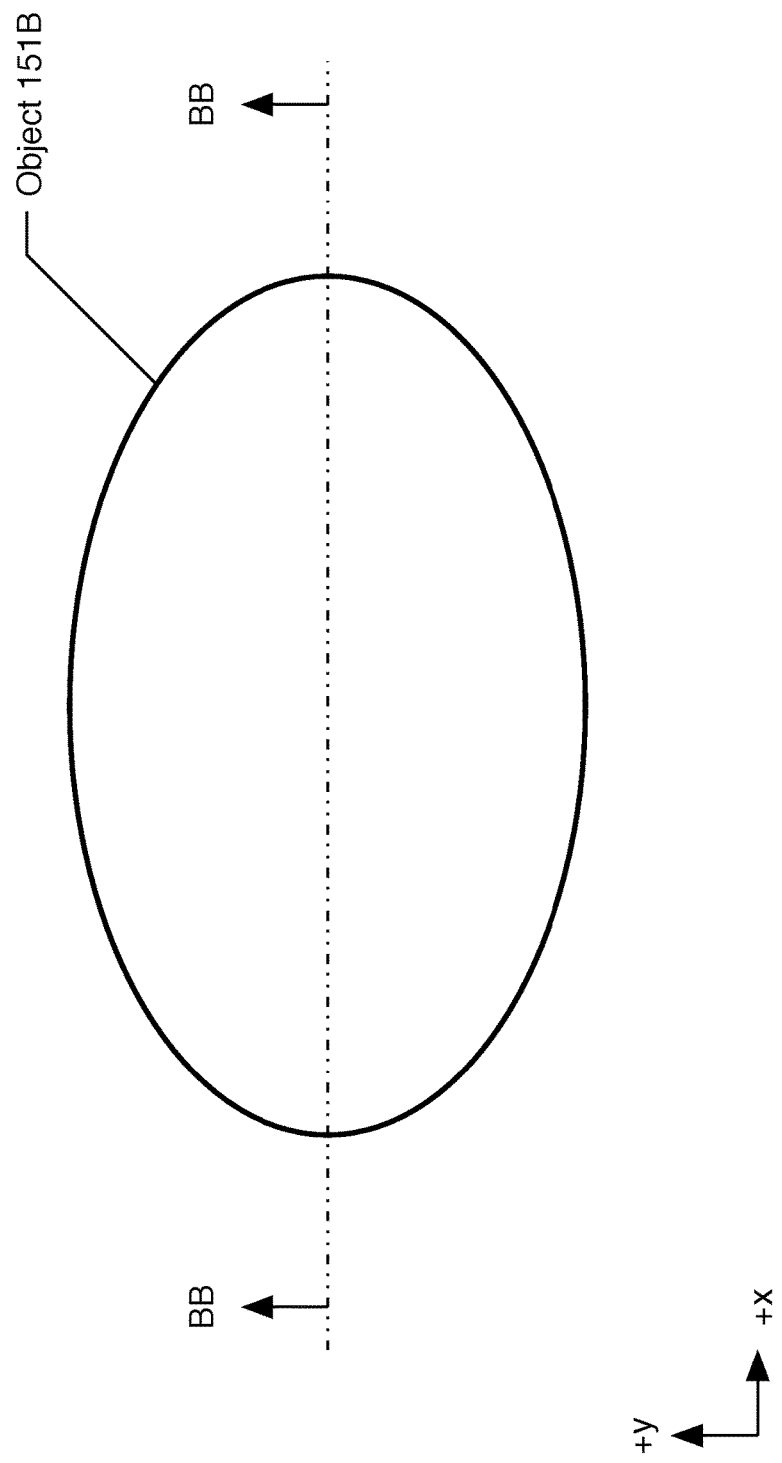

Second Illustrative Embodiment
(Orthographic Front Elevation View)

Second Illustrative Embodiment
(Orthographic Side Elevation View)

Deposition Layer DL[1]
For Second Illustrative Embodiment
(Orthographic Front Elevation View at Cross-Section BB-BB)

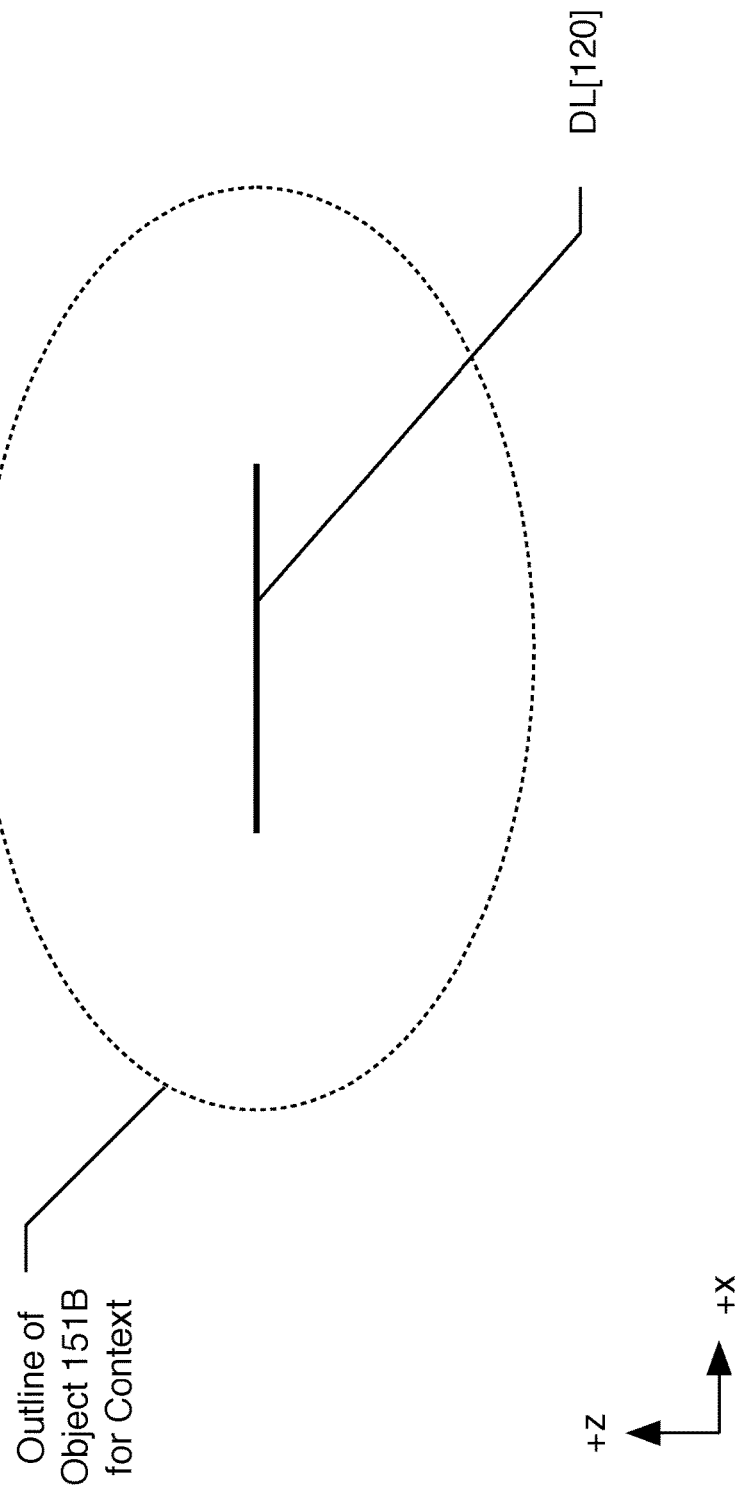

DEPOSITION OF NON-UNIFORM NON-OVERLAPPING CURVILINEAR SEGMENTS OF ANISOTROPIC FILAMENT TO FORM NON-UNIFORM LAYERS

STATEMENT OF RELATED APPLICATIONS

The following patent applications are incorporated by reference for the description of how to make and use additive manufacturing system 100:
- U.S. patent application Ser. No. 15/438,559, filing date Feb. 21, 2017;
- U.S. patent application Ser. No. 15/375,832, filing date Dec. 12, 2016;
- U.S. patent application Ser. No. 15/232,767, filing date Aug. 9, 2016;
- U.S. patent application Ser. No. 14/574,237, filing date Dec. 17, 2014; and
- U.S. patent application Ser. No. 14/623,471, filing date Feb. 16, 2015.

FIELD OF THE INVENTION

The present invention relates to additive manufacturing of three-dimensional object in general, and, more particularly, to techniques for fabricating objects with non-orthogonal surfaces and internal structures.

BACKGROUND

Additive manufacturing is a technique for building a three-dimensional object from a mathematical model of the object. In the additive manufacturing technique called fused-deposition modeling, the object is built by feeding a thermoplastic filament into a heated extrusion head. The heated extrusion head melts and deposits the molten thermoplastic material as one or more runs of material. Typically, a run of material is shaped like a thread or like the toothpaste that is squeezed from a tube but much smaller. When a run is deposited, it is just slightly above its melting point. After it is deposited, the run quickly solidifies and fuses with the runs that it touches.

Perhaps the greatest advantage of additive manufacturing is that it can build an object of any shape. To accomplish this, however, there are constraints on the sequence in which the runs can be deposited. First, each run must be supported. In other words, a run cannot be deposited on air. Therefore, each run must be deposited on:
 (i) a platform that is not part of the object, or
 (ii) one or more previously-deposited runs that will be part of the object, or
 (iii) a temporary scaffold of support material that is not part of the object, or
 (iv) any combination of i, ii, and iii.

Second, when a three-dimensional surface is sealed, it is no longer possible to deposit a run inside of that surface. This is analogous to the situation in which once you close a box, you can't put anything into the box.

There is a general methodology that is used in additive manufacturing that satisfies these constraints and enables the building of an object of any shape. The three-dimensional model of the object is modeled as thousands of thin horizontal layers. Each layer is modeled as thousands of runs and voids. The object is then built, one run at a time, one layer at a time, only in the +Z direction.

There are, however, costs and disadvantages associated with traditional additive manufacturing.

SUMMARY OF THE INVENTION

Some objects in accordance with the present invention exhibit more advantageous characteristics (e.g., mechanical, electrical, thermal etc.) in comparison to objects manufactured with planar or congruent layers.

For example, some embodiments of the present invention are able to deposit a series of layers of material such that the thickness of each layer at each location in the layer can be controlled. This enables each layer to have a uniform or non-uniform thickness, a planar or non-planar contour, and adjacent layers to morph from one contour to another.

In accordance with the illustrative embodiment, this is achieved by fabricating each layer from one or more non-overlapping curvilinear segments of anisotropic filament and by controlling the deposition height of each curvilinear segment at each location. In other words, by having an additive manufacturing process that can controllably vary the height of each curvilinear segment, the contour of each layer can be controlled to affect the overall characteristics of the object. This is, for example, advantageous for manufacturing objects with non-planar surfaces (e.g., airplane wings, ducts, propellers, axels, etc.) and objects that require non-planar internal structures to achieve desired characteristics.

BRIEF DESCRIPTION OF THE DRAWINGS

FIG. 3A depicts an orthographic plan view of the first illustrative embodiment—object 151A.

FIG. 3B depicts an orthographic front elevation view of object 151A.

FIG. 4C depicts an illustration of deposition layer DL[200] along cross-section AA-AA in object 151A.

mom

FIG. 5 depicts an illustration of deposition layers DL[1], DL[25], DL[50], DL[75], DL[100], DL[125], DL[150], DL[175], DL[200], DL[220], and DL[240] along cross-section AA-AA in object 151A.

FIG. 6A depicts an orthographic plan view of the second illustrative embodiment—object 151B.

FIG. 7C depicts an illustration of deposition layer DL[120] along cross-section BB-BB in object 151B.

DETAILED DESCRIPTION

For the purposes of this specification, the following terms and their inflected forms are defined as follows:
The term "horizontal" is defined as parallel to the X-Y plane.
The term "vertical is defined as normal to the X-Y plane.
The term "height" is defined as the maximum vertical range.
The term "top" is defined as the highest vertical extent.
The term "bottom" is defined as the lowest vertical extent.
The term "watertight" is defined as closed mathematical surface.

Figure 1:
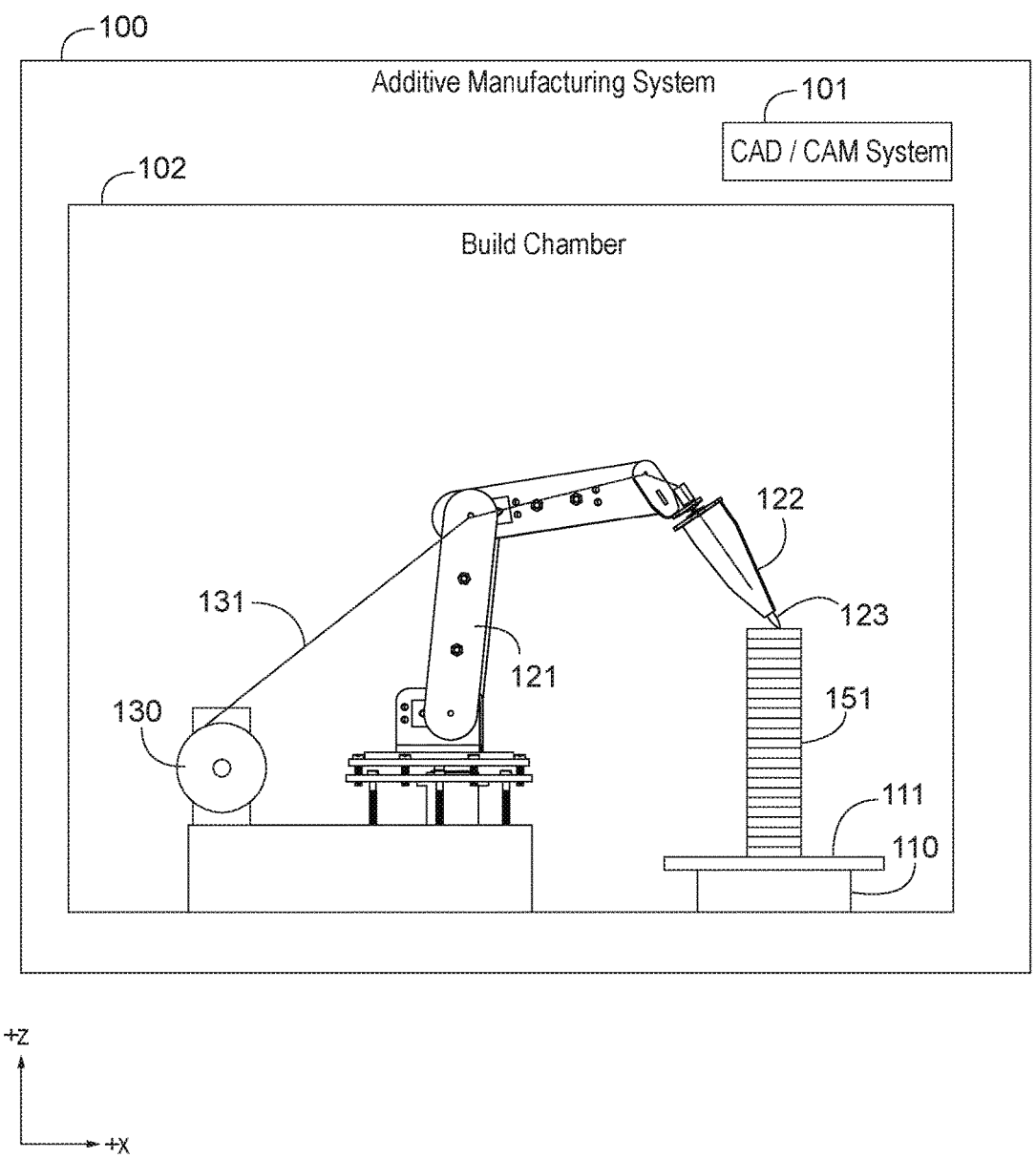
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: CAD/CAM system 101, build chamber 102, turn-table 110, deposition platform 111, robotic arm 121 (which itself comprises deposition head 122 and deposition needle 123), thermoplastic filament spool 130, and thermoplastic filament 131. The purpose of manufacturing system 100 is to manufacture object 151.

CAD/CAM system 101 comprises the hardware and software necessary to direct build chamber 102, control robotic arm 121, deposition head 122, deposition needle 123, and turntable 110 to manufacture object 151. It will be clear to those skilled in the art, after reading this disclosure, how to make and use CAM controller 101.

Build chamber 102 is a thermally-insulated, temperature-controlled environment in which object 151 is manufactured. It will be clear to those skilled in art how to make and use build chamber 102.

Turn-table 110 comprises a stepper motor under the control of CAM controller 101 that is capable of rotating platform 111 (and, consequently object 151) around the Z-axis. In particular, turn-table 110 is capable of:
  i. rotating platform 111 clockwise around the Z-axis from any angle to any angle, and
  ii. rotating platform 111 counter-clockwise around the Z-axis from any angle to any angle, and
  iii. rotating platform 111 at any rate, and
  iv. maintaining (statically) the position of platform 111 at any angle.
It will be clear to those skilled in the art how to make and use turn-table 110.

Platform 111 comprises hardware on which object 151 is manufactured. It will be clear to those skilled in the art how to make and use platform 111.

Robotic arm 121 is a seven-axis arm capable of placing deposition needle 123 at any location in the build volume of object 151 and from any approach angle. Furthermore, robotic arm can move deposition needle 123 in:
  i. the +X direction,
  ii. the -X direction,
  iii. the +Y direction,
  iv. the -Y direction,
  v. the +Z direction,
  vi. the -Z direction, and
  vii. any combination of i, ii, iii, iv, v, and vi
while rotating the approach angle of deposition needle 123 around any point or temporal series of points. It will be clear to those skilled in the art how to make and use robotic arm 121.

Deposition head 122 is hardware that heats and deposits filament 131 (which may partially or wholly contain one or more fiber strands) via deposition needle 123.

Thermoplastic filament 131 comprises a continuous tow of carbon fiber that is impregnated with a thermoplastic, but it will be clear to those skilled in the art, after reading this disclosure, how to make and use alternative embodiments of the present invention in which thermoplastic filament 131 has a different fiber composition as described in U.S. patent application Ser. No. 14/184,010, which is incorporated by reference.

Thermoplastic filament 131 is deposited as a plurality of segments of material, which are not shown in FIG. 1 as distinct from object 151. The physical and geometric properties of the runs of material are described below and in the accompanying figures.

Figure 2:
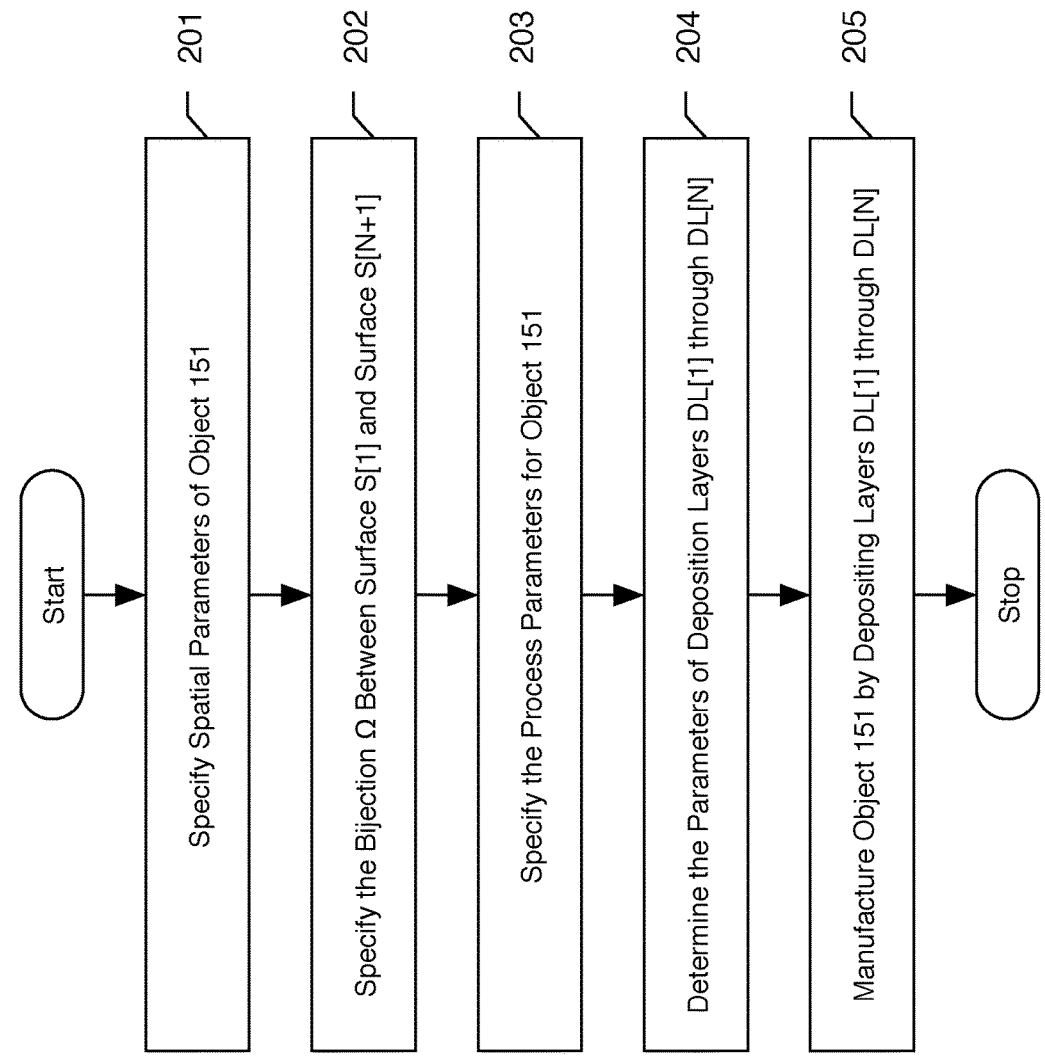
FIG. 2 depicts a flowchart of the salient tasks associated with the illustrative embodiment of the present invention.

FIG. 2 depicts a flowchart of the salient tasks associated with the illustrative embodiment of the present invention.

At task 201, the spatial parameters of object 151 are specified in CAD/CAM system 101. It will be clear to those skilled in the art how to specify the spatial parameters of any object.

Figure 3C:
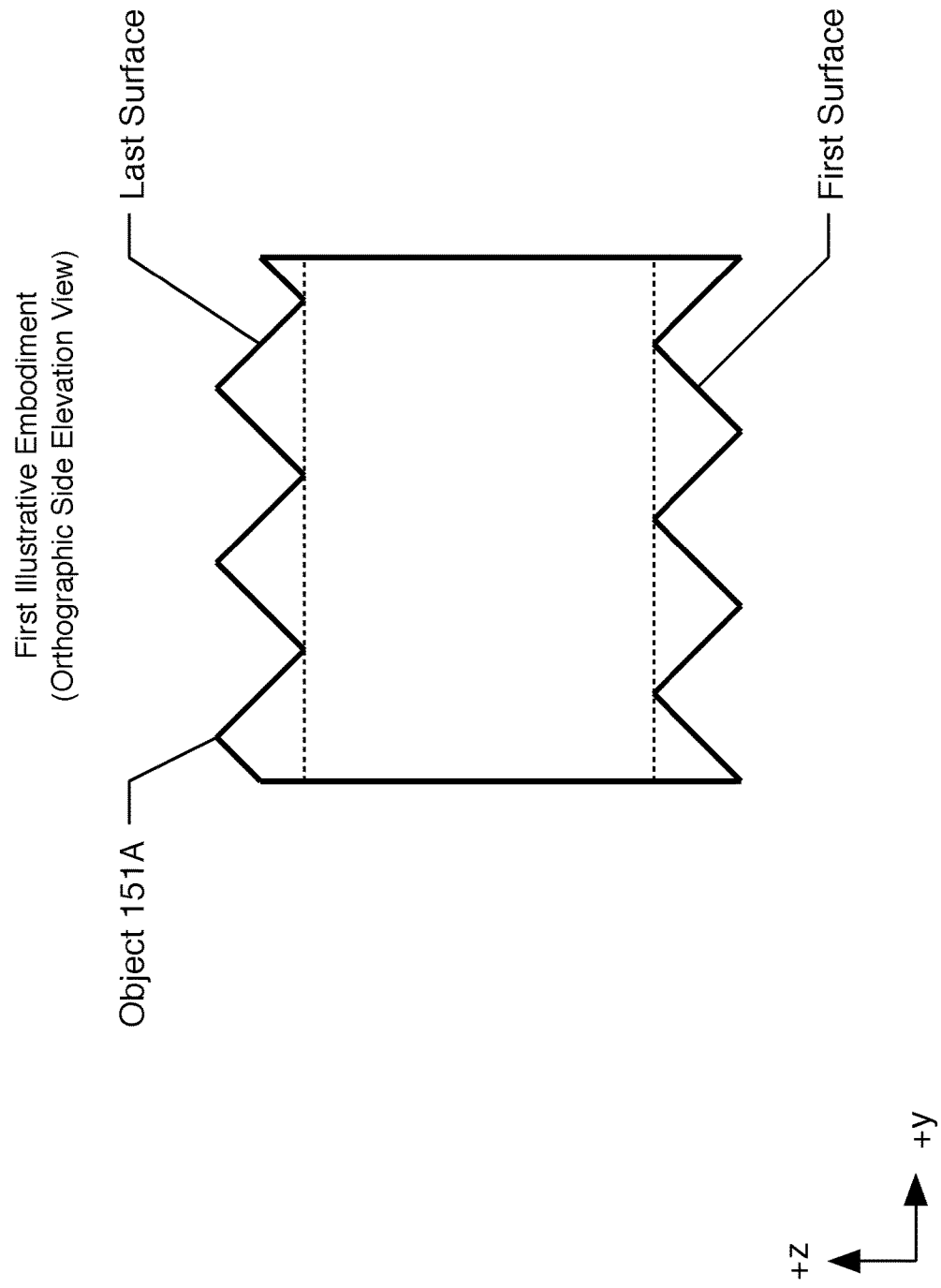
FIG. 3C depicts an orthographic side elevation view of object 151A.

For example, FIG. 3A depicts an orthographic plan view of the first illustrative embodiment—object 151A; FIG. 3B depicts an orthographic front elevation view of object 151A, and FIG. 3C depicts an orthographic side elevation view of object 151A.

The extent of object 151A is 60 millimeters high by 100 millimeters wide by 60 millimeters deep. Object 151A comprises a solid block of material—a three-dimensional periodic sawtooth pattern on the top of the block, and a three-dimensional periodic pattern on the bottom of the block. The peak-to-peak dimension of the sawtooth pattern is 10 millimeters and the period of the sawtooth pattern is 20 millimeters. The periodic sawtooth pattern on the top surface of object 151A is offset from the periodic sawtooth pattern on the bottom surface of object 151A by 5 millimeters (i.e., 90°) in the x-dimension and by 5 millimeters (i.e., 90°) in the y-dimension.

In accordance with the first illustrative embodiment, the spatial parameters of object 151A are described as a watertight triangle mesh (i.e., a polyhedron) comprising 152 triangles, in well-known fashion. The domain and range of object 151A are: domain x: [0≤x≤100] and y: [0≤y≤60], and range z: [0≤z≤60], where x, y, and z are real numbers.

Figure 6B:
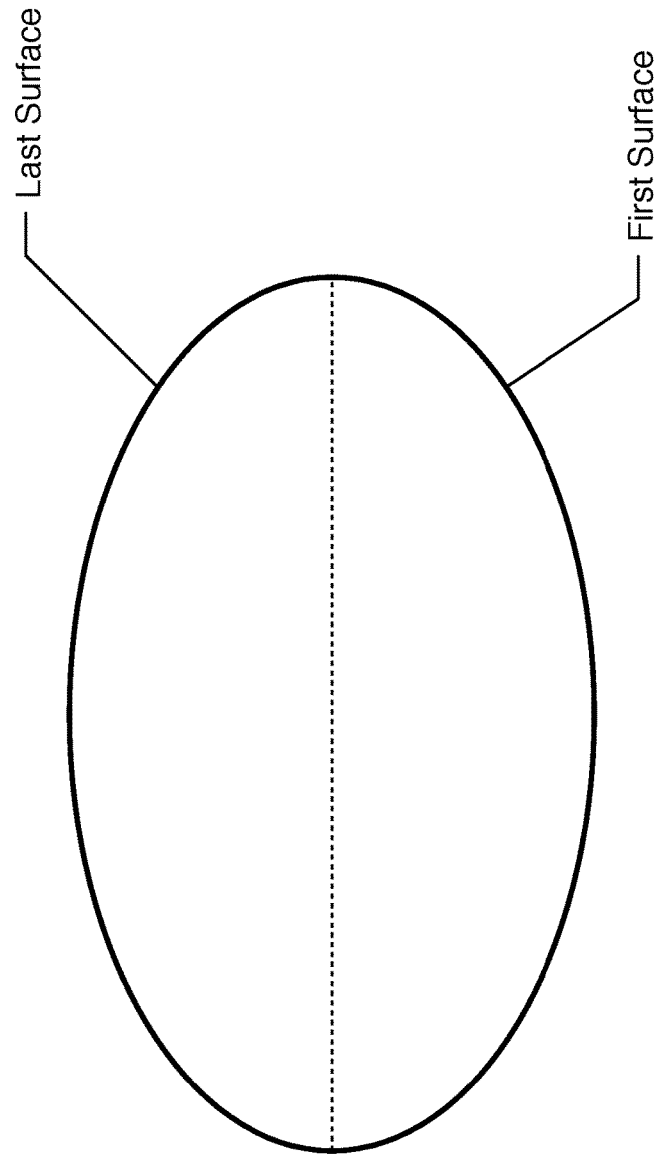
FIG. 6B depicts an orthographic front elevation view of object 151B.
Figure 6C:
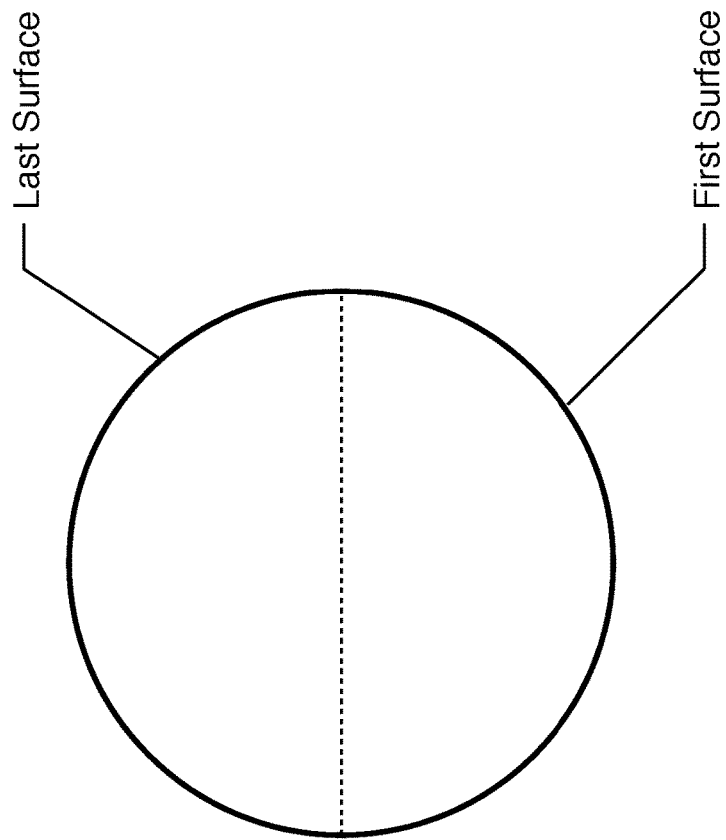
FIG. 6C depicts an orthographic side view of object 151B.

As another example, FIG. 6A depicts an orthographic plan view of the second illustrative embodiment—object 151B; FIG. 6B depicts an orthographic front elevation view of object 151B, and FIG. 6C depicts an orthographic side view of object 151B.

Object 151B is a solid ellipsoid of material that is 60 millimeters high by 100 millimeters wide by 60 millimeters deep. The spatial parameters of object 151B are specified algebraically by the equation:

$$\frac{x^2}{a^2} + \frac{y^2}{b^2} + \frac{z^2}{c^2} = 1 \tag{Eq. 1}$$

where x, y, and z are real numbers with domain x: [−50≤x≤50] and y: [−30≤y≤30] and range z: [−30≤z≤30], and such that a=100, b=60, and c=60.

Neither object 151A nor object 151B comprises a cavity (i.e., a hole, a void, or a wholly interior volume that does not comprise material), but it will be clear to those skilled in the art, after reading this disclosure, how to make and use alternative embodiments of the present invention that do comprise one or more cavities.

Object 151 is manufactured by serially depositing a plurality of deposition layers DL[1], . . . , DL[n], . . . , DL[N], where n and N are positive integers in the range in the range n, N ∈ {1, . . . , n, . . . , N}. Each deposition layer DL[n] is comprised of one or more non-overlapping curvilinear segments of anisotropic filament.

In accordance with the illustrative embodiment, the filament is continuous fiber thermoplastic whose tensile strength is higher parallel to the longitudinal axis of the fiber than perpendicular to the longitudinal axis. In some alternative embodiments of the present invention, the filament is chopped fiber thermoplastic. In yet some other alternative embodiments of the present invention, the filament comprises a core of one metal/alloy (e.g., tungsten, chromium-vanadium steel, steel, etc.) surrounded by a cladding or jacket of a second metal/alloy (e.g., copper, tin, zinc, brass, bronze, pewter, Galinstan®, copper-tungsten, cunife, manganin, titanium nitride, zamak, etc.).

Deposition layer DL[1] is deposited first; deposition layer DL[n] is deposited after and on top of deposition layer DL[n−1], and deposition layer DL[N] is deposited last. The domain of deposition layer DL[n] is less than or equal to the domain of object 151.

Deposition layer DL[n] is bounded by two surfaces: surface S[N] and surface S[N+1]. The boundary between deposition layer DL[n] and deposition layer DL[n+1] is surface S[N+1]. Surface S[N] is described by the continuous function:

$$S[n]=z=s(x,y,n). \quad \text{(Eq. 2a)}$$

Analogously, surface S[N+1] is described by the continuous function:

$$S[n+1]=z=s(x,y,n+1). \quad \text{(Eq. 2b)}$$

Therefore, surface S[1] is exposed and is only a boundary of deposition layer DL[1], and surface S[N+1] is exposed and is only a boundary of deposition layer DL[N].

The thickness T[n] of deposition layer DL[n] equals:

$$T[n]=t(x,y,n)=s(u,v,n+1)-s(x,y,n) \quad \text{(Eq. 3)}$$

where s(u, v, n+1) is the point on the surface S[n+1] that intersects a vector that is normal to S[n] at s(x, y, n), where u and v are real numbers. It will be clear to those skilled in the art how to compute T[n].

The parameters of deposition layers DL[1], . . . , DL[N] are determined as described in detail below and in the accompanying figures.

At task 202, a bijection Ω is specified in CAD/CAM system 101 between:
 i. surface S[1] comprised of object 151, and
 ii. surface S[N+1] comprised of object 151, and
 iii. (optionally) one or more intermediate surfaces S[2], . . . , S[N] comprised of object 151 that are specified to have particular contours and domain in order to affect the structural properties or manufacturability of object 151.

In accordance with the first illustrative embodiment, the bijection Ω is between surface S[1] and surface S[N+1] and does not include any intermediate layers. The equation for surface S[1] comprised of object 151A is specified by the following piecewise equation:

$$S[1] = s(x, y, 1) = \begin{cases} y', & \text{iff } y' \le x' \text{ and } y' \le -x' + 20 \\ x', & \text{iff } y' > x' \text{ and } y' \le -x' + 20 \\ 10 - y', & \text{iff } y' > x' \text{ and } y' > -x' + 20 \\ 10 - x', & \text{iff } y' \le x' \text{ and } y' > -x' + 20 \end{cases} \quad \text{(Eq. 4a)}$$

wherein y'=y mod 20 and x'=x mod 20. The equation for surface S[N+1] comprised of object 151A is specified by the following piecewise equation:

$$S[N+1] = \quad \text{(Eq. 4b)}$$

$$s(x, y, N+1) = \begin{cases} y'' + 50, & \text{iff } y'' \le x'' \text{ and } y'' \le -x'' + 20 \\ x'' + 50, & \text{iff } y'' > x'' \text{ and } y'' \le -x'' + 20 \\ 60 - y'', & \text{iff } y'' > x'' \text{ and } y'' > -x'' + 20 \\ 60 - x'', & \text{iff } y'' \le x'' \text{ and } y'' > -x'' + 20 \end{cases}$$

wherein y''=(y+5) mod 20 and x''=(x+15) mod 20.

In accordance with the first illustrative embodiment, the bijection $\Omega_A$ of surface S[1] of object 151A to surface S[N+1] of object 151A equals:

$$\Omega_A: s(x,y,1) \rightarrow s(x,y,N+1) \quad \text{(Eq. 5)}$$

The bijection $\Omega_A$ in Equation 5 is advantageous when the domain of surface S[1] equals the domain of surface S[N+1] and there is no particular advantage to modifying the vertical point-to-point mappings of the surface. In contrast, when there is a first contour feature at coordinate (x, y) on surface S[1] that is advantageously mapped to a second contour feature on surface S[N+1] that is not at the same (x, y) coordinate, a mapping between the two features might be appropriate. For example, an extrema (e.g., a global maxima, a global minima, a local maxima, a global minima, etc.) on surface S[1] might advantageously be mapped to an extrema (e.g., a global maxima, a global minima, a local maxima, a global minima, etc.) on surface S[N+1]. In any case, it will be clear to those skilled in the art, after reading this disclosure, how to specify any bijection $\Omega_A$.

In accordance with the first illustrative embodiment, the bijection $\Omega_A$ between surface S[1] and surface S[N+1] does not include any intermediate layers. In accordance with a variation of the first illustrative embodiment, one or more intermediate surface shape can be specified and mapped to surface S[1] and surface S[N+1]. For example, assuming a value of N=240, in some case it might be structurally superior and faster to manufacture when some of the intermediate layers are horizontal planes. In particular surface S[60] might be specified to equal:

$$S[60]=s(x,y,60)=12.5 \quad \text{(Eq. 6a)}$$

and surface S[180] might be specified to equal:

$$S[180]=s(x,y,180)=37.5 \quad \text{(Eq. 6b)}$$

in which case the bijection $\Omega_A$ could be extended to:

$$\Omega_{A1}: s(x,y,1) \rightarrow s(x,y,60) \quad \text{(Eq. 7a)}$$

$$\Omega_{A2}: s(x,y,60) \rightarrow s(x,y,180) \quad \text{(Eq. 7b)}$$

$$\Omega_{A3}: ss(x,y,180) \rightarrow s(x,y,N+1) \quad \text{(Eq. 7c)}$$

Alternatively, the intermediate deposition layers might be specified to be hollow tessellated polyhedrons (e.g., tetrahedrons, cubes, etc.). In any case, it will be clear to those skilled in the art, after reading this disclosure, how to specify any intermediate surfaces of any shape and how to extend the bijection to include those intermediate layers.

In accordance with the second illustrative embodiment, surface S[1] comprised of object 151B equals:

$$S[1] = s(x, y, 1) = -\frac{c\sqrt{a^2b^2 - a^2y^2 - a^2x^2}}{ab} \quad \text{(Eq. 8a)}$$

and surface S[N+1] comprised of object 151A equals:

$$S[N+1] = s(x, y, N+1) = +\frac{c\sqrt{a^2b^2 - a^2y^2 - a^2x^2}}{ab}. \quad \text{(Eq. 8b)}$$

In accordance with the first illustrative embodiment, surface S[1] comprised of object 151A is disjoint from surface S[N+1] comprised of object 151A. In contrast, surface S[1] comprised of object 151B intersects surface S[N+1] comprised of object 151B at the z=0 plane to form a "seam." This seam is advantageous in that it reduces the amount of surface area that exposes the edges of the deposition layer and produces an overall smooth surface for object 151B. The fact that the surface S[1] comprised of object 151B intersects surface S[N+1] comprised of object 151B implies that the intermediate layers will have a smaller domain than surface S[1] and surface S[N+1], which yields deposition layers that resemble the layers of an ellipsoid onion.

In accordance with the second illustrative embodiment, the bijection $\Omega_B$ of surface S[1] comprised of object 151B to surface S[N+1] comprised of object 151B equals:

$$\Omega_B:s(x,y,1) \rightarrow s(x,y,N+1) \quad \text{(Eq. 9)}$$

This mapping is appropriate when the domain of surface S[1] equals the domain of surface S[N+1] and when surface S[1] is a reflection of surface S[N+1]. It will be clear to those skilled in the art, after reading this disclosure, that there are other possible mappings of surface S[1] comprised of object 151A to surface S[N+1] comprised of object 151A. For example, the local maxima of surface S[1] can be mapped to the local maxima of surface S[N+1]. As another example, the local maxima of surface S[1] can be mapped to the local minima of surface S[N+1].

At task 203, the process parameters for the manufacture of object 151 are specified in CAD/CAM System 101. These parameters include:
  i. the nominal thickness $t_{nom}$ of a segment of thermoplastic material, and
  ii. the maximum thickness $t_{max}$ of a segment of thermoplastic material, and
  iii. the minimum thickness $t_{min}$ of a segment of thermoplastic material.

The nominal thickness $t_{nom}$ of a segment of thermoplastic material is a function of the material, the deposition process, and the structural parameters for object 151. In accordance with the first and second illustrative embodiments, the value of $t_{nom}$ equals 250 microns. It will be clear to those skilled in the art how to determine and specify the nominal thickness of a segment of thermoplastic material.

The maximum thickness $t_{max}$ of a segment of thermoplastic material is a function of the material, the deposition process, and the structural parameters for object 151. In accordance with the first and second illustrative embodiments, the value of $t_{max}$ equals 500 microns. It will be clear to those skilled in the art how to determine and specify the maximum thickness of a segment of thermoplastic material.

The minimum thickness $t_{min}$ of a segment of thermoplastic material is a function of the material, the deposition process, and the structural parameters for object 151. In accordance with the first and second illustrative embodiments, the value of equals 100 microns. It will be clear to those skilled in the art how to determine and specify the minimum thickness of a segment of thermoplastic material.

At task 204, CAD/CAM system 101 determines the number of deposition layers used to manufacture object 151 and the parameters of those layers. Task 204 is described in detail below and in the accompanying figures.

At task 205, additive manufacturing system 100 deposits a plurality of segments of anisotropic filament in adjacent rows to form each of deposition layers DL[1] through DL[N].

In accordance with the first illustrative embodiment, object 151A comprises 240 deposition layers DL[1] through DL[240]. The domain and thickness of each of deposition layers DL[1] through DL[240] is determined in task 204.

Figure 4A:
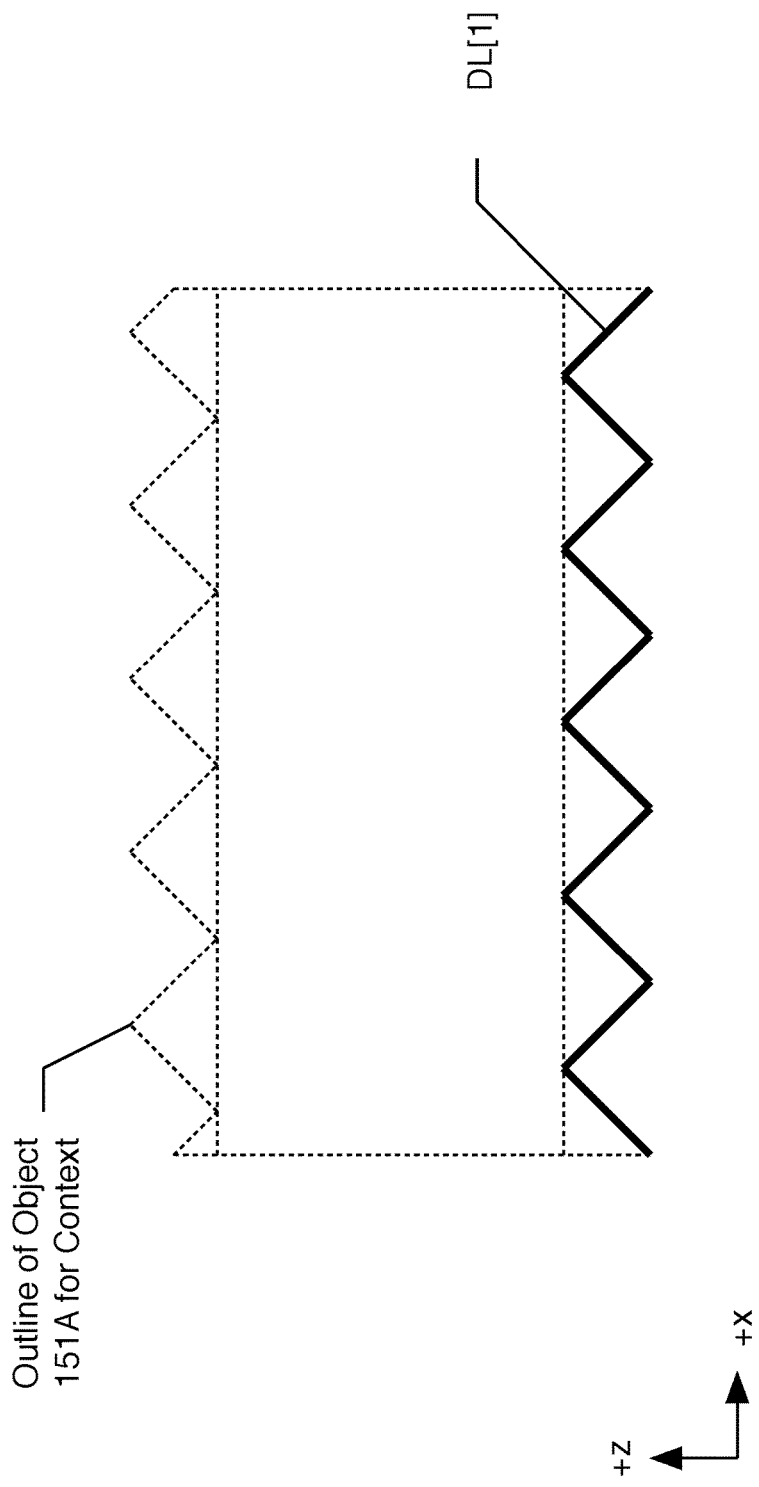
FIG. 4A depicts an illustration of deposition layer DL[1] along cross-section AA-AA in object 151A.
Figure 4B:
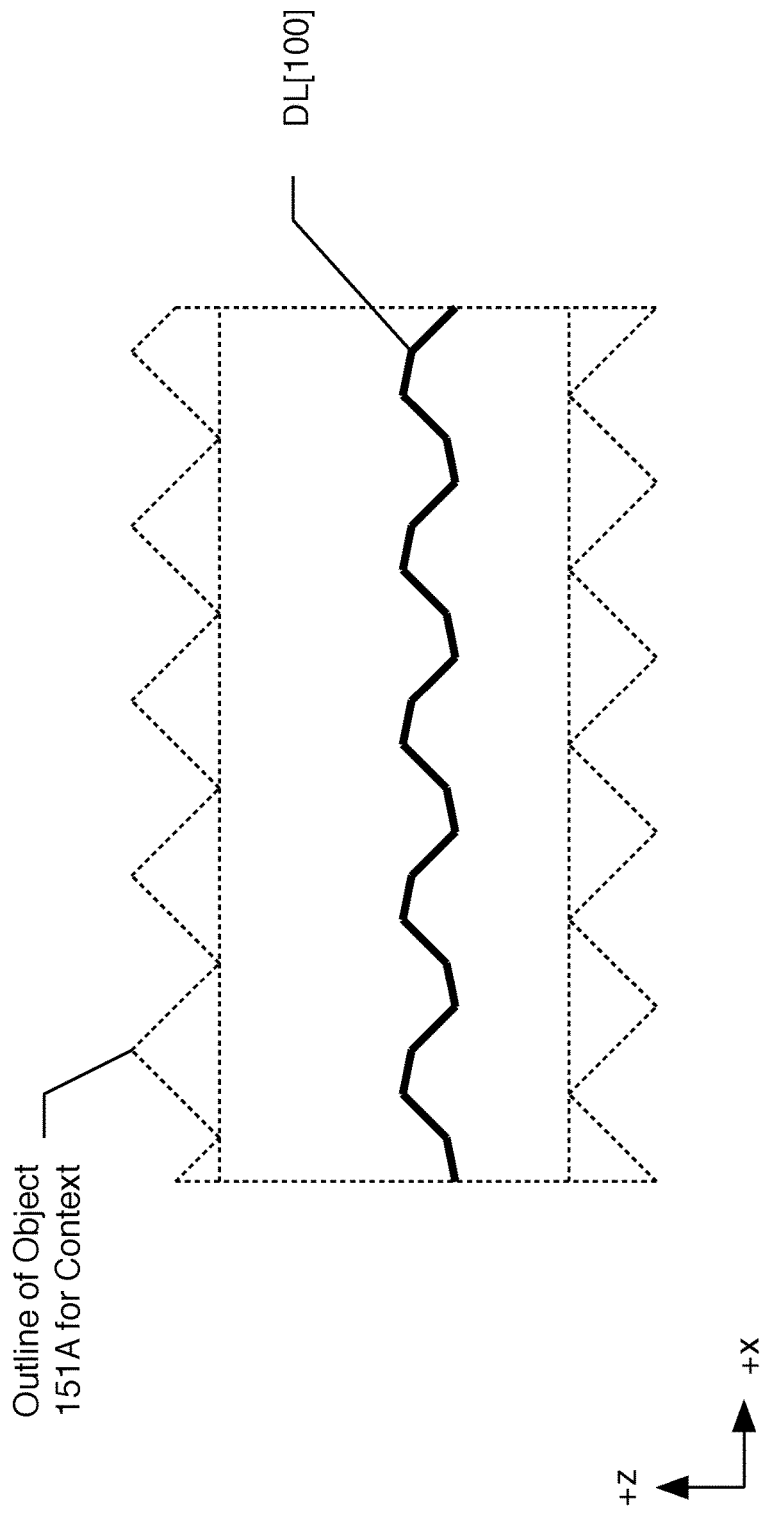
FIG. 4B depicts an illustration of deposition layer DL[100] along cross-section AA-AA in object 151A.
Figure 4D:
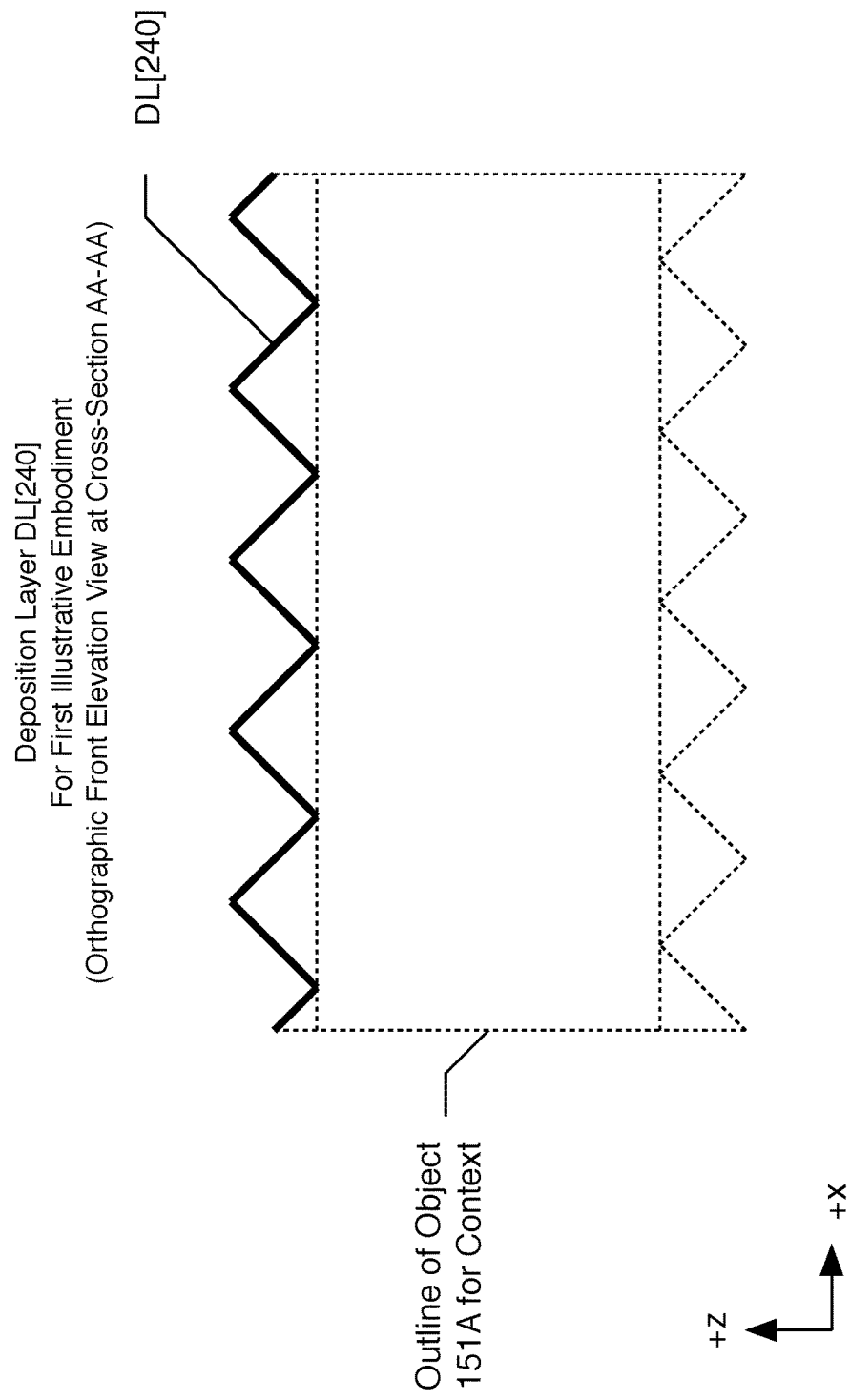
FIG. 4D depicts an illustration of deposition layer DL[240] along cross-section AA-AA in object 151A.

FIG. 4A depicts an illustration of deposition layer DL[1] along cross-section AA-AA in object 151A. FIG. 4B depicts an illustration of deposition layer DL[100] along cross-section AA-AA in object 151A. FIG. 4C depicts an illustration of deposition layer DL[200] along cross-section AA-AA in object 151A. FIG. 4D depicts an illustration of deposition layer DL[240] along cross-section AA-AA in object 151A.

FIG. 5 depicts an illustration of deposition layers DL[1], DL[25], DL[50], DL[75], DL[100], DL[125], DL[150], DL[175], DL[200], DL[220], and DL[240] along cross-section AA-AA in object 151A. In FIG. 5, it can be seen how the shape of the deposition layers morphs throughout object 151A from deposition layer DL[1] on the bottom to deposition layer DL[N] on top. Furthermore, it can be seen in FIG. 5 that the domain of each of deposition layers DL[1] through DL[N] is the same.

Figure 7A:
FIG. 7A depicts an illustration of deposition layer DL[1] along cross-section BB-BB in object 151B.
Figure 7B:
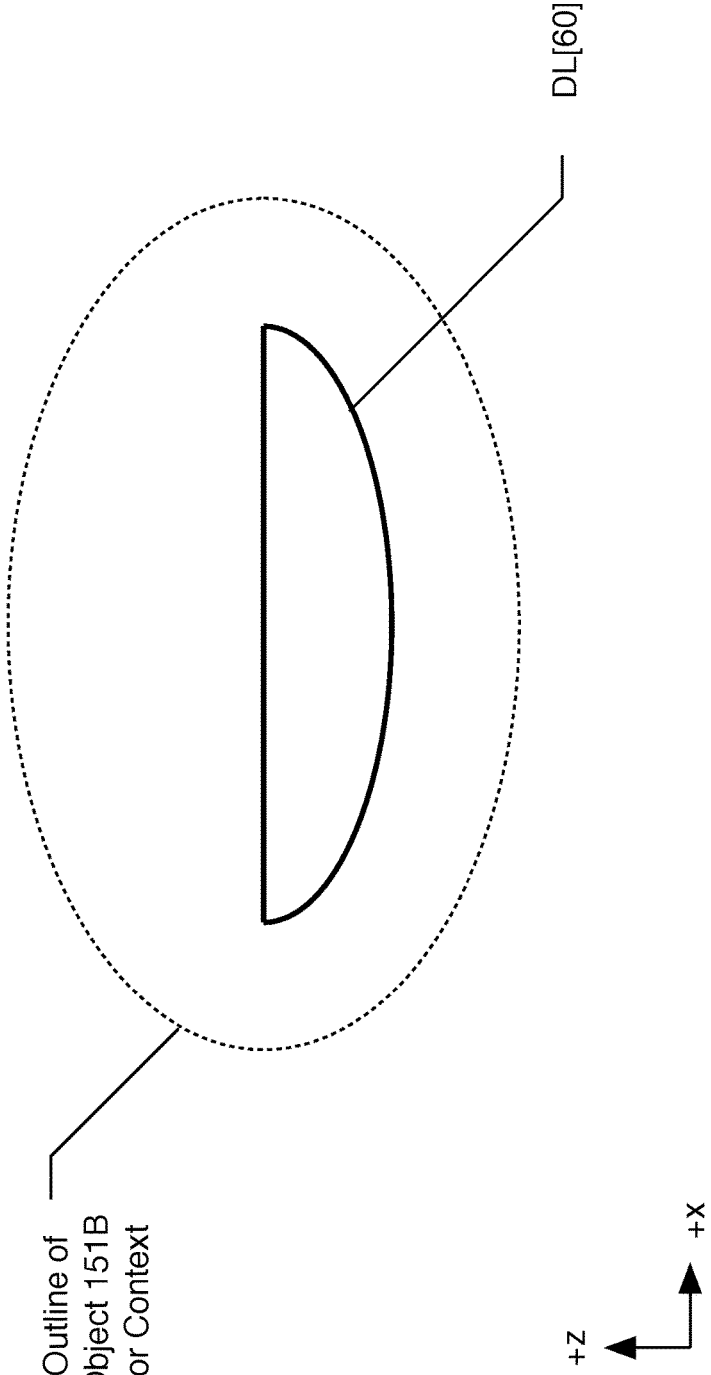
FIG. 7B depicts an illustration of deposition layer DL[60] along cross-section BB-BB in object 151B.
Figure 7D:
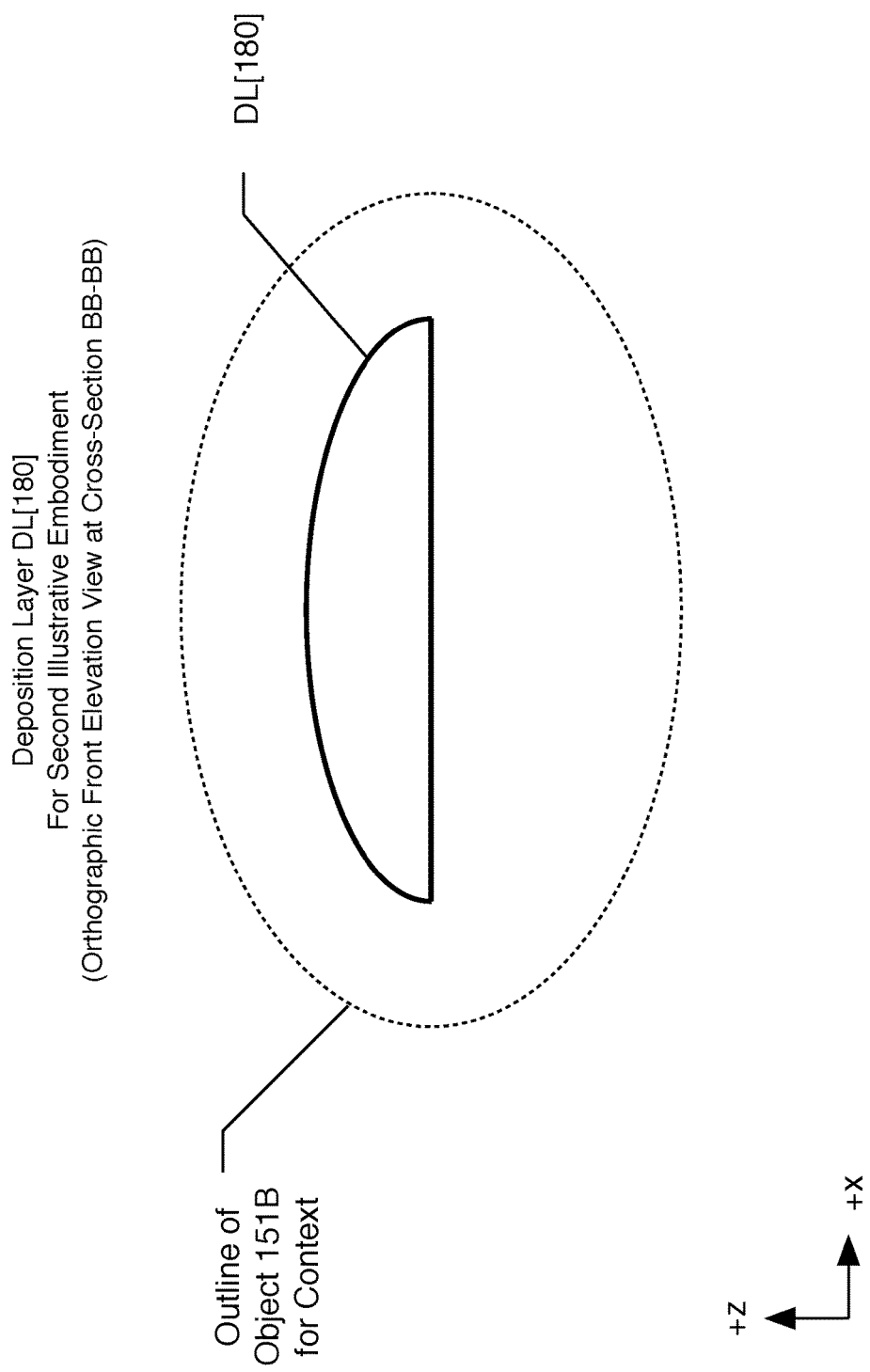
FIG. 7D depicts an illustration of deposition layer DL[180] along cross-section BB-BB in object 151B.
Figure 7E:
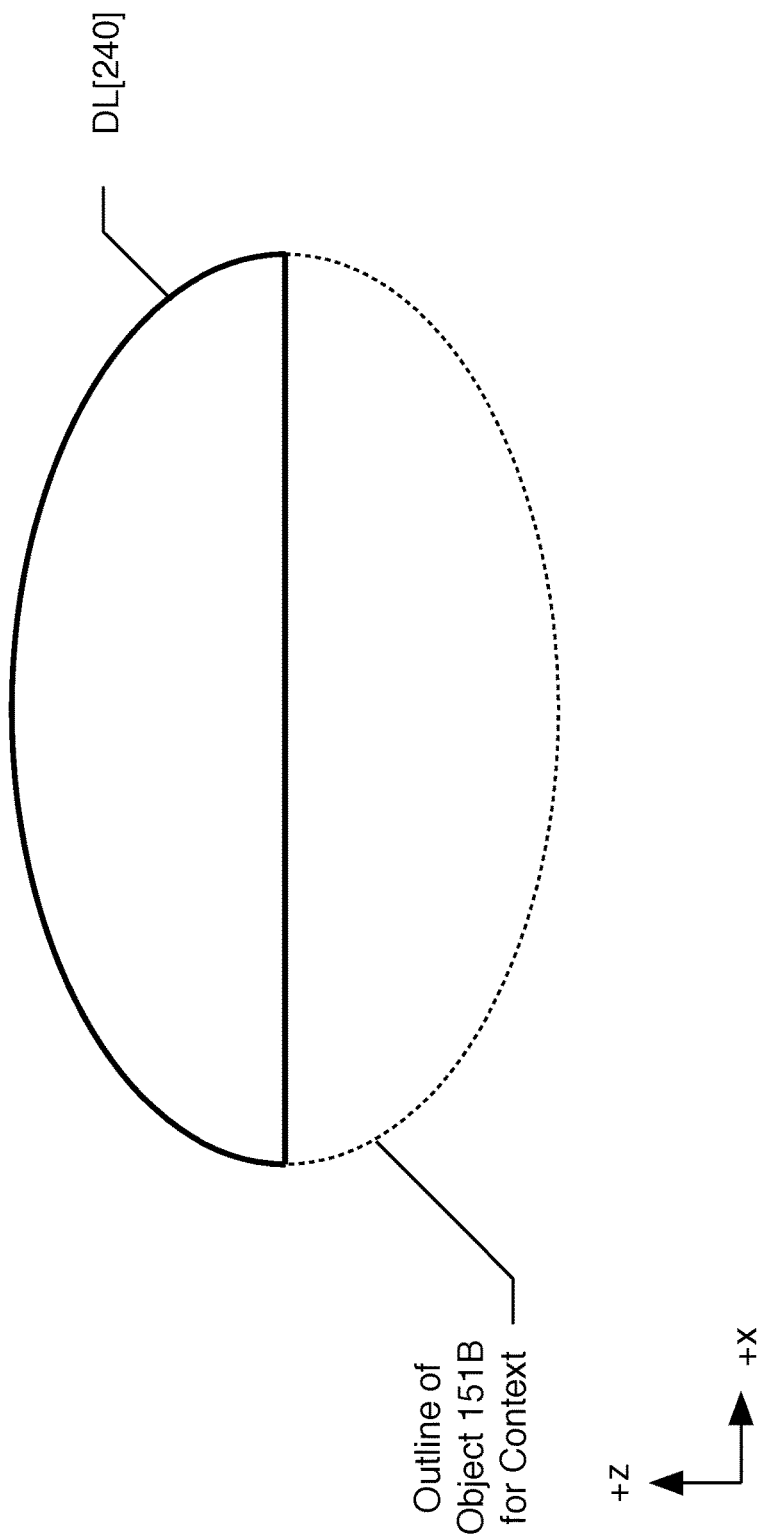
FIG. 7E depicts an illustration of deposition layer DL[240] along cross-section BB-BB in object 151B.

FIG. 7A depicts an illustration of deposition layer DL[1] along cross-section BB-BB in object 151B. FIG. 7B depicts an illustration of deposition layer DL[60] along cross-section BB-BB in object 151B. FIG. 7C depicts an illustration of deposition layer DL[120] along cross-section BB-BB in object 151B. FIG. 7D depicts an illustration of deposition layer DL[180] along cross-section BB-BB in object 151B. FIG. 7E depicts an illustration of deposition layer DL[240] along cross-section BB-BB in object 151B.

Figure 8:
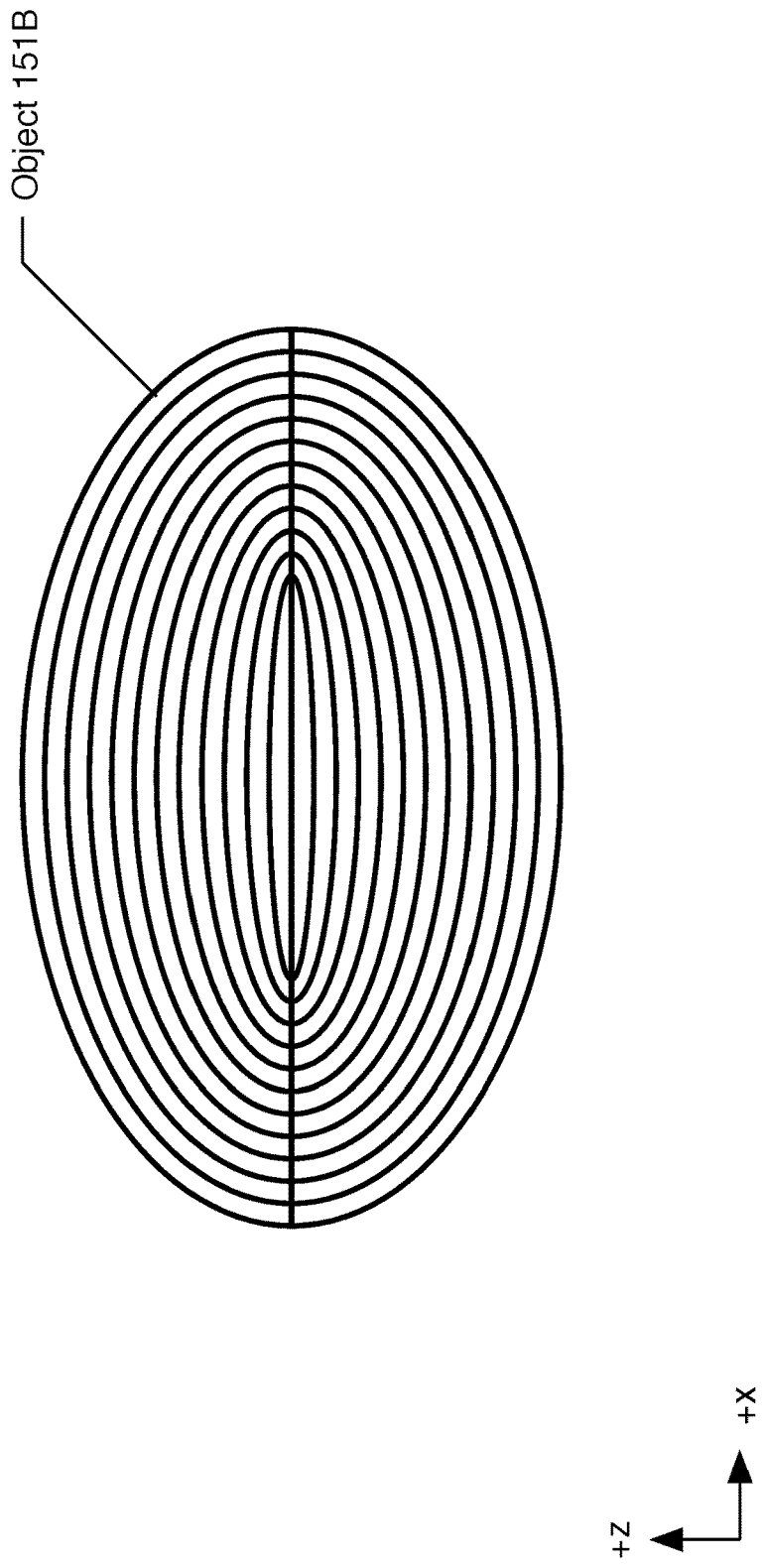
FIG. 8 depicts an illustration of deposition layers DL[1], DL[10], DL[20], DL[30], DL[40], DL[50], DL[60], DL[70], DL[80], DL[90], DL[100], DL[110], DL[120], DL[130], DL[140], DL[150], DL[160], DL[170], DL[180], DL[190], DL[200], DL[210], DL[220], DL[230], and DL[240] along cross-section BB-BB in object 151B.

FIG. 8 depicts an illustration of deposition layers DL[1], DL[10], DL[20], DL[30], DL[40], DL[50], DL[60], DL[70], DL[80], DL[90], DL[100], DL[110], DL[120], DL[130], DL[140], DL[150], DL[160], DL[170], DL[180], DL[190], DL[200], DL[210], DL[220], DL[230], and DL[240] along cross-section BB-BB in object 151B. In FIG. 8, it can be seen how the shape of the deposition layers morphs throughout object 151B from deposition layer DL[1] on the bottom to deposition layer DL[N] on top. Furthermore, it can be seen in FIG. 8 that the domain of deposition layers DL[1] through DL[120] diminishes, but that the domain of of deposition layers DL[1] through DL[120] increases.

Figure 9:
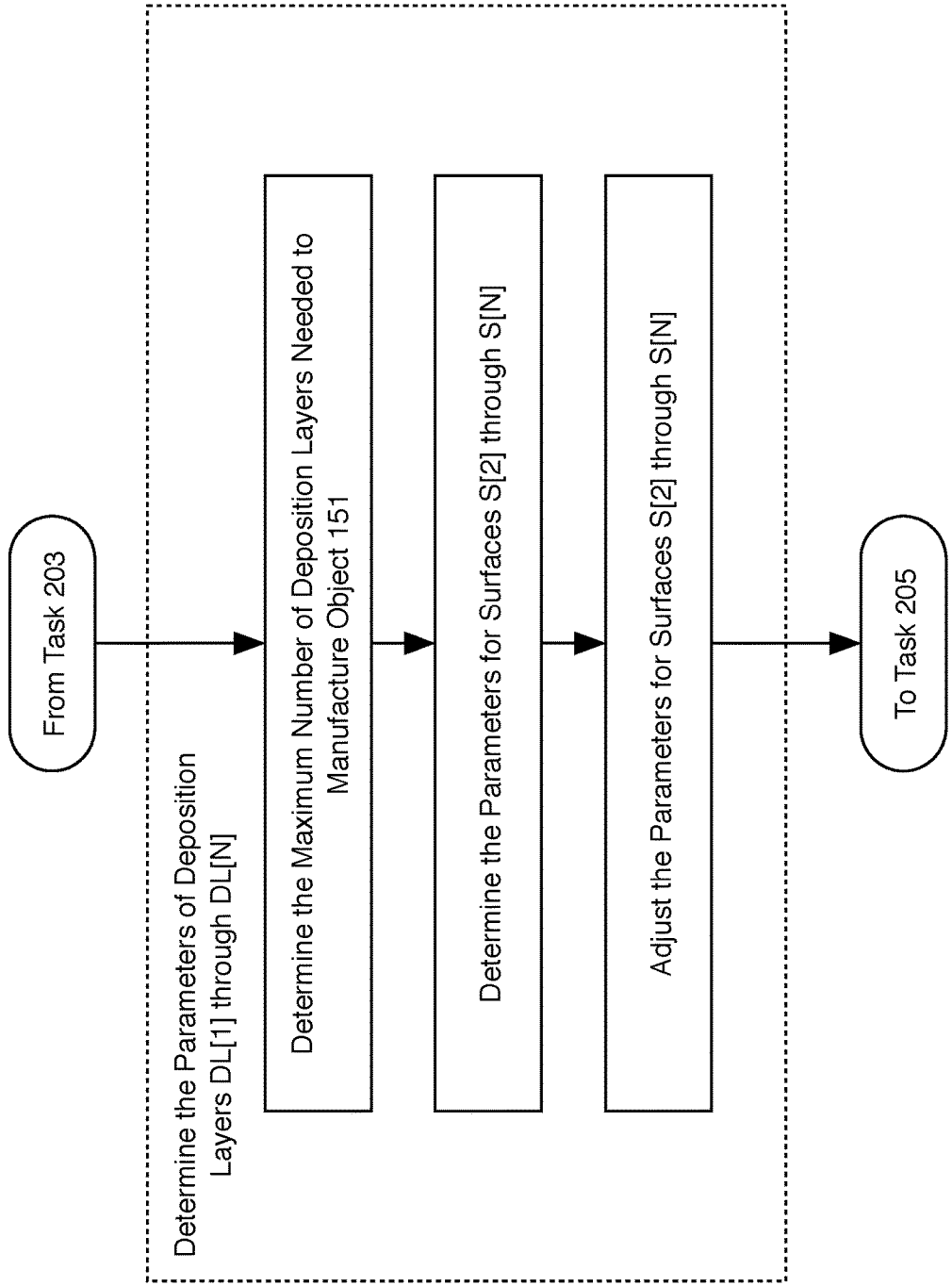
FIG. 9 depicts a flowchart of the salient subtasks associated with task 204—determining the parameters of deposition layers DL[1] through DL[N].

FIG. 9 depicts a flowchart of the salient subtasks associated with task 204—determining the parameters of deposition layers DL[1] through DL[N].

At subtask 901, CAD/CAM system 101 determines the total number of deposition layers N that will be used to manufacture object 151. This equals:

$$N = \frac{z_{max}}{t_{nom}} \quad \text{(Eq. 10)}$$

where $z_{max}$ equals the maximum extent of object 151 in the z-dimension.

In accordance with the first illustrative embodiment, $z_{max}$ equals 60 millimeters and $t_{nom}$ equals 250 microns. Therefore, object 151A will be manufactured with N=60/0.25=240 deposition layers—DL[1] through DL[240].

In accordance with the second illustrative embodiment, $z_{max}$ also equals 60 millimeters and $t_{nom}$ also equals 250 microns. Therefore, object 151B will also be manufactured with N=60/0.25=240 deposition layers—DL[1] through DL[240].

It will be clear to those skilled in the art, after reading this disclosure, how to make and use alternative embodiments of the present invention that comprise any number of deposition layers.

At subtask 902, CAD/CAM system 101 determines the parameters for surfaces S[2] through S[N]. When there are no intermediate layers specified, the equation for surface S[N] equals the linear interpolation in N steps between surface S[1] and surface S[N+1] consistent with bijection Ω.

In accordance with the first illustrative embodiment and the bijection $\Omega_A$, the surface S[N] equals:

$$S[n] = s(x, y, n) = s(x, y, 1) + \frac{n-1}{N}[s(x, y, N) - s(x, y, 1)] \quad \text{(Eq. 11)}$$

It will be clear to those skilled in the art how to determine the expression for surface S[N] from equations 4a, 4b, and 11.

In accordance with the second illustrative embodiment and the bijection $\Omega_B$, the unadjusted surface S[N] equals:

$$S[n] = s(x,y,n) = s(x,y,1) + n-1/N[s(x,y,N) - s(x,y,1)] \quad \text{(Eq. 12)}$$

It will be clear to those skilled in the art how to determine the expression for surface S[N] from equations 8a, 8b, and 12.

When intermediate layers—for example S[60] and S[180]—are specified in addition to S[1] and S[N], the equation for surfaces S[2] through S[59] equals the linear interpolation between S[1] and the first intermediate layer S[60] in 60 steps consistent with bijection Ω. Similarly, the equation for surfaces S[60] through S[180] equals the linear interpolation between S[60] and S[180] in 120 steps consistent with bijection and the equation for surfaces S[180] through S[240] equals the linear interpolation between S[180] and S[240] in 60 steps consistent with bijection Ω. It will be clear to those skilled in the art, after reading this disclosure, how to perform subtask 902.

At subtask 903, CAD/CAM system 101 adjusts the parameters for surfaces S[2] through S[N] as determined in subtask 902, when necessary or desired.

The first step in subtask 902 is determining the unadjusted thickness of each layer T[n] in accordance with Equation 3 and the values of surface S[N+1] and surface S[N] determined in subtask 902.

This is necessary to ensure that the parameters of surfaces S[2] through S[N] do not result in deposition layers that are too thin or too thick. In other words, when:

$$t_{min} \leq T[n] \leq t_{max} \forall x,y,n \quad \text{(Eq. 13)}$$

then the parameters of surfaces S[2] through S[N] are satisfactory and do not need to be adjusted.

In contrast, when a contiguous area in T[n] is too thin (i.e., $<t_{min}$), the corresponding area in surface S[N+1] is adjusted to equal the value of the corresponding area in surface S[N], which effectively sets T[n] for that area to zero and transfers that volume of material to the corresponding area in deposition layer DL[n+1]. Similarly, when a contiguous area in T[n] is too thick (i.e., $>t_{max}$), the corresponding area in surface S[N+1] is adjusted to equal to $t_{nom}$, which transfers the excess volume of material to the corresponding area in deposition layer DL[n+1].

Additionally, the thickness of one or more layers can be specified by a user of CAD/CAM system 101, and the remaining layers adjusted accordingly. For example, in accordance with the second illustrative embodiment of the present invention, deposition layers DL[1] and DL[N] are specified to have a uniform thickness of 500 microns, and deposition layers DL[2] through DL[N−1] are adjusted accordingly to ensure that the outside surface of object 151B exposes only two layers.

In accordance with the first illustrative embodiment, Relation 13 is satisfied for all 240 deposition layers DL[1] through DL[240], and, therefore, no adjustments are necessary.

In contrast, Relation 13 is not satisfied for deposition layers DL[2] through DL[239] (i.e., the layers whose thickness was not explicitly specified by the user and not in accordance with Equation 13). In this case, the domain of each layer is reduced by twice $t_{nom}$ in the x-dimension and twice $t_{nom}$ in the y-dimension for each deposition layer DL[1] through DL[120], but increases by twice $t_{nom}$ in the x-dimension and twice $t_{nom}$ in the y-dimension for each deposition layer DL[121] through DL[240].

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An article of manufacture comprising:
   a first layer DL[n] comprised of non-overlapping curvilinear segments of anisotropic filament, wherein the first layer DL[n] is bounded by a first surface z=s(x,y,n) and a second surface z=s(x,y,n+1);
   wherein s(u,v,n+1)−s(x,y,n)≠constant for all x,y, wherein s(u,v,n+1) is a point on the second surface that intersects a vector that is normal to the first surface at s(x,y,n); and
   wherein n is an integer, x and u are real numbers in the domain x,u: [$x_S < x_L$], y and v are real numbers in the domain y,v: [$y_S < y_L$], z is a real number in the range z: [$z_S < z_L$].

2. The article of manufacture of claim 1 wherein $s(u_1, v_{1,n+1}) - s(x_1, y_1, n)$ is a first extrema; and
   wherein $x_1$ and $y_1$ are real numbers, $x_S < x_1 < x_L$, and $y_S < y_1 < y_L$.

3. The article of manufacture of claim 2 wherein $s(u_2, v_2, n+1) - s(x_2, y_2, n)$ is a second extrema; and wherein $x_2$ and $y_2$ are real numbers, $x_S < x_1 < x_2 < x_L$, and $y_S < y_1 < y_2 < y_L$.

4. The article of manufacture of claim 3 wherein the first extrema is a first local maxima and the second extrema is a second local maxima.

5. The article of manufacture of claim 3 wherein the first extrema is a first local minima and the second extrema is a second local minima.

6. The article of manufacture of claim 3 wherein the first extrema is a first local maxima and the second extrema is a first local minima.

7. An article of manufacture comprising:
a first layer DL[n] comprised of non-overlapping curvilinear segments of anisotropic filament, wherein the first layer DL[n] is bounded by a first surface $z=s(x,y,n)$ and a second surface $z=s(x,y,n+1)$;
a second layer DL[n+1] comprised of non-overlapping curvilinear segments of anisotropic filament, wherein the second layer DL[n+1] is bounded by the second surface $z=s(x,y,n+1)$ and a third surface $z=s(x,y,n+2)$;
wherein $s(u_1,v_1,n+1)-s(x_1,y_1,n)$ is a first extrema, wherein $s(u_1,v_1,n+1)$ is the a first point on the second surface that intersects a vector that is normal to the first surface at $s(x_1,y_1,n)$;
wherein $s(u_2,v_2,n+2)-s(x_2,y_2,n+1)$ is a second extrema, wherein $s(u_2,v_2,n+2)$ is a second point on the third surface that intersects a vector that is normal to the second surface at $s(x_2,y_2,n+1)$;
wherein $s(u_3,v_3,n+1)-s(x_3,y_3,n)$ is a third extrema, wherein $s(u_3,v_3,n+1)$ is a third point on the second surface that intersects a vector that is normal to the first surface at $s(x_3,y_3,n)$;
wherein $s(u_4,v_4,n+2)-s(x_4,y_4,n+1)$ is a fourth extrema, wherein $s(u_4,v_4,n+2)$ is a fourth point on the third surface that intersects a vector that is normal to the second surface at $s(x_4,y_4,n+1)$; and
wherein n is an integer, $x,x_1,x_2,x_3,x_4,u_1,u_2,u_3$, and $u_4$ are real numbers in the domain x: $[x_S < x_1,x_2,x_3,x_4,u_1,u_2,u_3,u_4 < x_L]$, $y,y_1,y_2,y_3,y_4,v_1,v_2,v_3$, and $v_4$ are real numbers in the domain y: $[y_S < y_1,y_2,y_3,y_4,v_1,v_2,v_3,v_4 < y_L]$, and z is a real number in the range z: $[z_S < z_L]$.

8. The article of manufacture of claim 7 wherein $x_1=x_2$, $x_3=x_4, y_1=y_2$, and $y_3=y_4$.

9. The article of manufacture of claim 7 wherein $x_1>x_2$, $x_3=x_4, y_1=y_2$, and $y_3=y_4$.

10. The article of manufacture of claim 7 wherein $x_1>x_2$, $x_3>x_4, y_1>y_2$, and $y_3>y_4$.

11. The article of manufacture of claim 7 wherein $x_1>x_2$, $x_3<x_4, y_1>y_2$, and $y_3<y_4$.

12. The article of manufacture of claim 7 wherein the first extrema is a first local maxima and the third extrema is a second local maxima.

13. The article of manufacture of claim 7 wherein the first extrema is a first local minima and the third extrema is a second local minima.

14. The article of manufacture of claim 7 wherein the first extrema is a first local maxima and the third extrema is a first local minima.

15. An article of manufacture comprising:
a first layer DL[n] comprised of non-overlapping curvilinear segments of anisotropic filament, wherein the first layer DL[n] is bounded by a first surface $z=s(x,y,n)$ and a second surface $z=s(x,y,n+1)$;
a second layer DL[n+1] comprised of non-overlapping curvilinear segments of anisotropic filament, wherein the second layer DL[n+1] is bounded by the second surface $z=s(x,y,n+1)$ and a third surface $z=s(x,y,n+2)$;
wherein $s(u_1,v_1,n+1)-s(x_1,y_1,n)$ is a first extrema, wherein $s(u_1,v_1,n+1)$ is a second point on the second surface that intersects a vector that is normal to the first surface at $s(x_1,y_1,n)$;
wherein $s(u_2,v_2,n+2)-s(x_1,y_1,n+1)$ is a second extrema, wherein $s(u_2,v_2,n+2)$ is a third point on the third surface that intersects a vector that is normal to the second surface at $s(x_1,y_1,n+1)$; and
wherein n is an integer, $x,x_1,u_1$, and $u_2$ are real numbers in the domain x: $[x_S < x_1,u_1,u_2 < x_L]$, $y,y_1,v_1$, and $v_2$ are real numbers in the domain y: $[y_S < y_1,v_1,v_2 < y_L]$, and z is a real number in the range z: $[z_S < z_L]$.

16. The article of manufacture of claim 15 wherein the first extrema is a first local maxima and the second extrema is a second local maxima.

17. The article of manufacture of claim 15 wherein the first extrema is a first local maxima and the second extrema is a first local minima.

18. The article of manufacture of claim 15 wherein the first extrema is a first local minima and the second extrema is a second local minima.

19. The article of manufacture of claim 15 further comprising:
a third layer DL[n+2] comprised of non-overlapping curvilinear segments of anisotropic filament, wherein the third layer DL[n+2] is bounded by the third surface $z=s(x,y,n+2)$ and a fourth surface $z=s(x,y,n+3)$;
wherein $s(u_3,v_3,n+3)-s(x_1,y_1,n+2)$ is a third extrema, wherein $s(u_3,v_3,n+3)$ is a fourth point on the fourth surface that intersects a vector that is normal to the third surface at $s(x_1,y_1,n+2)$; and
wherein the first extrema is a first local maxima and the third extrema is a first local minima;
wherein $u_3$ is a real number in the domain x: $[x_S < u_3 < x_L]$, and $v_3$ is a real number in the domain y: $[y_S < v_3 < y_L]$.

20. The article of manufacture of claim 19 wherein the first extrema is a first local minima and the third extrema is a first local maxima.

* * * * *